W. A. FRANK.
MEASURING AND INDICATING APPARATUS.
APPLICATION FILED JUNE 1, 1911.
1,006,473.
Patented Oct. 24, 1911.
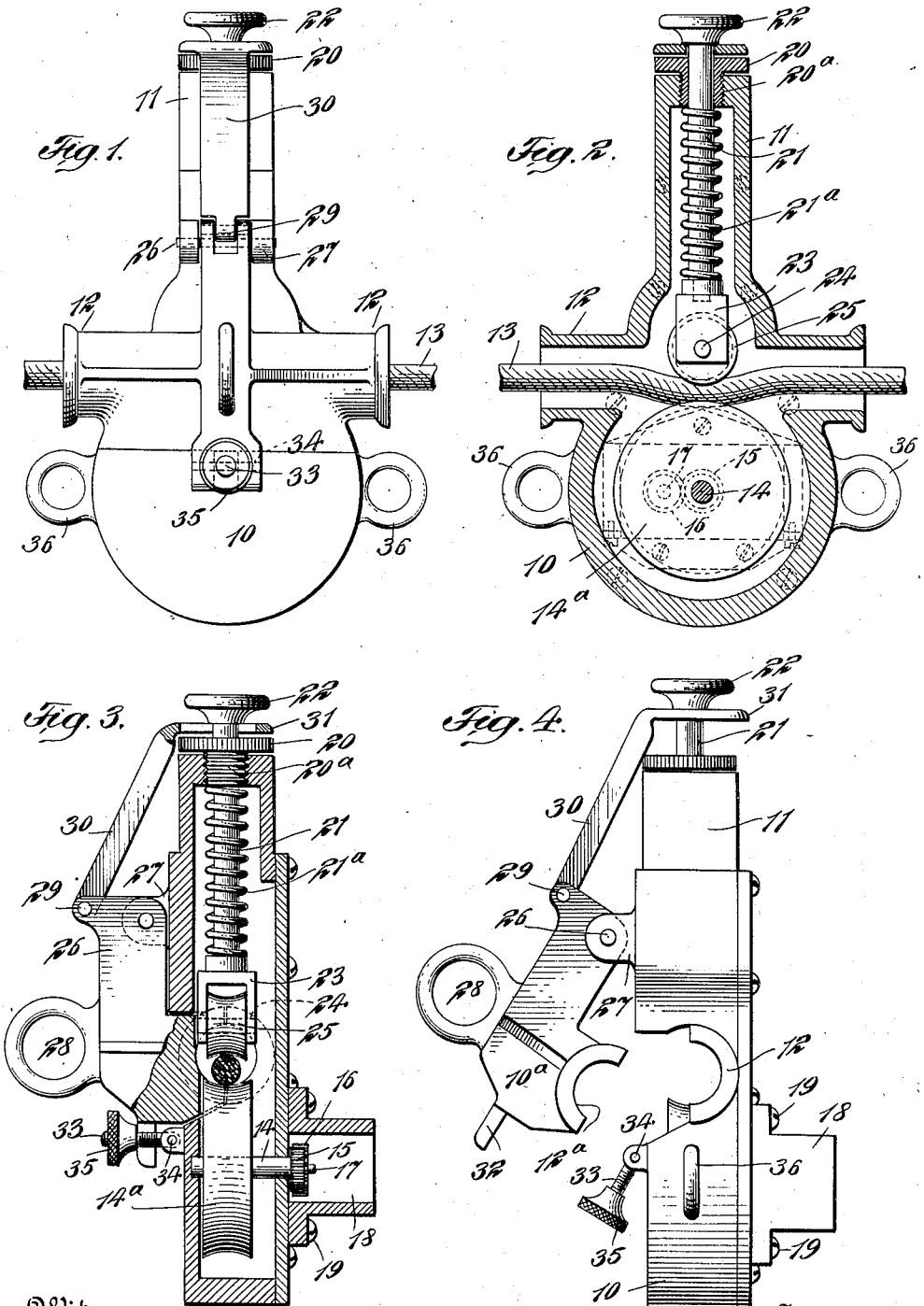

UNITED STATES PATENT OFFICE.

WILLIAM ADOLPH FRANK, OF HACKENSACK, NEW JERSEY, ASSIGNOR TO FRANK & HEDDEN COMPANY, OF JERSEY CITY, NEW JERSEY, A CORPORATION OF NEW JERSEY.

MEASURING AND INDICATING APPARATUS.

1,006,473.  Specification of Letters Patent.  Patented Oct. 24, 1911.

Application filed June 1, 1911. Serial No. 630,670.

*To all whom it may concern:*

Be it known that I, WILLIAM ADOLPH FRANK, citizen of the United States of America, residing at Hackensack, Bergen county, New Jersey, have invented certain new and useful Improvements in Measuring and Indicating Apparatus, of which the following is a specification.

My invention relates to an improved measuring and indicating apparatus, designed to measure and indicate the run or length of a cable, wire, cord or the like, as it is paid out or hauled in.

One of the objects of the invention is to provide an apparatus of simple construction which is adapted to accurately measure the run or length of a cable or the like moved in the direction of its length, and to give direct readings of the result in any desired scale measure.

A further object of the invention is to provide means whereby the object, of which the length is to be measured, may be readily inserted in, or removed from, the device, without excessive effort, or likelihood of damage to any operative parts of the mechanism.

A still further object is to provide a portable structure, which is adapted for removable installation in positions usually considered difficult of access to apparatus of the kind herein referred to.

Other objects and advantages of the invention will more fully appear from the following description thereof.

The invention consists of the novel structural features, and combinations of elements, hereinafter described and particularly pointed out in the claims appended at the foot hereof.

To enable the construction and operation of the invention to be clearly understood by those skilled in the art, reference is had to the accompanying drawing illustrating one of several forms in which the invention may be concretely embodied.

Figure 1 is a rear elevational view of my improved apparatus showing a fragment of cable inserted therein; Fig. 2 is a vertical, central, sectional view thereof looking at the rear of the apparatus; Fig. 3 is a side elevational view, shown partly in vertical section; and Fig. 4 is a side elevational view of the apparatus in position for the removal or insertion of a cable.

In the preferred form of my invention I employ a pair of coacting presser members between which the cable to be measured passes, one of these members being capable of transmitting the movement of the cable to suitable mechanism giving the desired reading. The other presser member is preferably yieldingly held in removable contact with the cable and is automatically moved away therefrom when the apparatus is opened to permit of the removal or insertion of a cable.

Referring to the drawing by reference numerals, it will be noted that I provide an inclosing casing comprising a substantially annular or drum like section 10 and an elongated section 11 preferably formed integrally with the section 10. Intermediate the two sections referred to, the casing is formed as a semi-tube 12, of the proper configuration to receive the cable 13.

Bearing in the front and rear walls of the casing section 10 and adapted for revolution therein is a stud or shaft 14 upon which is rigidly fixed a wheel $14^a$ the face of which is preferably concaved to accommodate the cable 13. To one end of the shaft 14 is fixed a gear wheel 15 normally in mesh with a gear wheel 16 carried on a shaft 17 which forms the main driving shaft of any desired or approved type of counting or indicating mechanism. This counting mechanism is contained in the casing 18 secured by screws 19 to the casing section 10, and inasmuch as the construction of said counting mechanism forms no part of my invention I deem it unnecessary to describe or illustrate the same.

The head of the casing section 11 is provided with a threaded bore for the reception of the correspondingly threaded shank $20^a$ of a hollow nut 20 having a knurled head as shown. Extending through the nut 20 into the casing 11 is a stem 21, one end thereof being formed as, or provided with, a head 22 and its opposite end carrying the yoke or bifurcated bearing 23. Fixed in the arms of the bearing 23 is a stud or shaft 24 which revolubly supports the wheel 25, the face of which is preferably concaved. Coiled about the stem 21 is an extension spring $21^a$ one end of which abuts against the bearing member 23 and the opposite end against the under face of the shank $20^a$ of the nut 20.

For convenience in inserting a cable in the apparatus or removing the same therefrom, I provide the casing section 10 with a movable portion 10ª which is pivotally mounted at 26 between the projecting lugs 27. The inner face of the pivoted casing portion is formed as a semi-tube 12ª and is complemental to the semi-tube 12, the two semi-tubes forming a complete tube when the section 10ª is closed down on the section 10. To permit of the section 10ª being moved easily, I form thereon an eye 28 offering a finger hold to the operator. Pivoted at 29 to the section 10ª is a link or lever 30, at one end of which is a collar 31 embracing the stem 21 in proximity to the head 22 thereof. Projecting from the lower edge of the movable section 10ª is a pair of lugs 32 between which the retaining screw-stem 33, pivoted at 34 to the casing member and having the knurled nut 35 threaded thereto, is adapted to enter when the casing section 10ª is closed down on the section 10.

As it is my purpose to make the apparatus portable and of such character that it may readily follow the swing of any cable in connection with which it is employed, I form at each of the side walls of one of the casing sections, preferably in the walls of the section 10, eyes 36 which are designed to receive the ropes or cables by which the device may be suspended in operative position.

The operation of the invention is very simple and will be clearly understood from the following description thereof:—When it is desired to insert a cable in position in the apparatus the screw-stem 33 is released and the movable casing section 10ª raised as shown in Fig. 4. By raising the section 10ª the link 30 is caused to press against the under side of the head 22 thereby raising the stem 21 and the wheel 25, against the tension of the spring 21ª. The cable is laid into the semi-tube 12 and rests upon or over the concaved wheel 14ª, and the casing section 10ª is then closed down and clamped to the casing section 10 by means of the screw stem 33 and nut 35. As the section 10ª is lowered the collar 31 moves away from the head 22 permitting the spring 21ª to extend and depress the stem 21 thus forcing the wheel 25 against the cable 13 as clearly shown in Fig. 2. In this position of the parts, when there is movement of the cable in either direction the stud 14 is correspondingly rotated, whereby the intermeshing gear wheels 15 and 16 cause proper actuation of the counting and indicating mechanism. By turning the nut 20 in either direction the tension of the spring 21ª and consequently the pressure of the wheel 25 upon the cable 13 may be varied, and by this means the device may be adjusted to receive cables of different sizes. It will of course be understood that if it is desired to measure only the quantity of cable paid out and not that hauled in, the gear wheels 15 and 16 may be thrown out of mesh when the cable is drawn backwardly or other suitable means employed to render the counting and indicating apparatus inoperative at predetermined times.

Although, in the foregoing specification, I have described my invention in detail, I desire it to be understood that the invention is not limited to the details shown or described and may be modified, within the scope of the claims, without departing from the spirit of the invention.

Having thus described my invention, what I claim as new and desire to secure by Letters Patent is:—

1. In a device of the character described, the combination with a casing having a section thereof movable, of a pair of coacting presser members in said casing, means whereby the distance between the operative surfaces of said presser members is varied upon movement of said movable casing section, and means actuated by one of said presser members for measuring and indicating the run of the object to be measured.

2. In a device of the character described, the combination with a casing having a section thereof movable, of a pair of coacting presser members in said casing, means whereby one of said presser members is moved relatively to the other when said movable casing section is moved, means whereby said movable presser member is yieldingly urged toward the other presser member, and means actuated by one of said presser members for measuring and indicating the run of the object to be measured.

3. In a device of the character described, the combination with a fixed casing section and a movable casing section pivoted thereto, each of said sections being formed with an opening which said openings are adapted to be juxtaposed to provide a passage through the device for the object to be measured, of a pair of coacting presser members in the fixed casing section, and means actuated by one of said presser members for measuring and indicating the run of said object.

4. In a device of the character described, the combination with a fixed casing section, of a movable casing section pivoted thereto, a presser member revoluble in a fixed plane in said fixed casing, a second presser member adapted to coact with said first named presser member, a link connection from said movable casing section to said second named presser member whereby the latter is moved by movement of said pivoted section, and means actuated by the first named presser member for measuring and indicating the run of the object to be measured.

5. In a device of the character described, the combination with a fixed casing section having an opening therethrough, of a movable casing section having an opening adapted to aline with the opening in the fixed casing and provide a passage through the device for the object to be measured, a presser member revoluble in a fixed plane in the fixed casing below the opening therein, a headed stem depending in said fixed casing, a second presser member carried in bearings at the lower end of said stem, a link having one end pivoted to said movable casing section and its opposite end formed as a collar embracing said stem below the head thereof whereby when said pivoted casing section is moved away from the fixed casing the second named presser member will be moved away from the first named presser member, an extension spring encircling said stem and adapted to automatically return the second named presser member to operative position when the pivoted casing section is moved against the fixed casing, a nut for adjusting the tension of said spring, and means actuated by the first named presser member for measuring and indicating the run of a cable.

In testimony whereof I have affixed my signature in presence of two witnesses.

WILLIAM ADOLPH FRANK.

Witnesses:
  CLINTON INGLEE,
  OTTO MUNK.